(12) United States Patent
Shibuya et al.

(10) Patent No.: US 6,291,098 B1
(45) Date of Patent: *Sep. 18, 2001

(54) THIN TYPE CELL HAVING SUPERIOR AIR-TIGHTNESS AND MECHANICAL STRENGTH

(75) Inventors: Mashio Shibuya, Miyagi; Hiroyuki Akashi, Kanagawa, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,122

(22) Filed: Feb. 25, 1998

(30) Foreign Application Priority Data

Feb. 26, 1997 (JP) .................................................... 9-042517
Jan. 29, 1998 (JP) .................................................... 10-016908

(51) Int. Cl.⁷ .................................................... H01M 2/06
(52) U.S. Cl. ............................................ 429/163; 429/211
(58) Field of Search .................................... 429/162, 163, 429/211, 100, 127

(56) References Cited

U.S. PATENT DOCUMENTS 3,607,401 * 9/1971 Halpert et al. .................... 429/127 X
4,092,464 * 5/1978 Dey et al. .
4,758,482 * 7/1988 Yamana et al. .................. 429/163 X
4,997,732 * 3/1991 Austin et al. ..................... 429/163 X
5,077,153 12/1991 Grange-Cossou et al. .
5,456,813 10/1995 Grange-Cossou et al. .
5,591,540 1/1997 Louie et al. .
5,837,397 * 11/1998 Xing ..................................... 429/162

FOREIGN PATENT DOCUMENTS 0 390 557 A2  10/1990 (EP) .
2 200 068 A    7/1988 (GB) .

* cited by examiner

Primary Examiner—Gabrielle Brouillette
Assistant Examiner—Susy Tsang
(74) Attorney, Agent, or Firm—Bell, Boyd & Lloyd LLC

(57) ABSTRACT

A thin type cell is made up of a cathode 1, an anode 2 and an electrolyte 3, sheathed within a moisture-proofing multi-layered film 4 comprising a heat fusible layer and a metal foil. A pair of electrode terminals 5, 6 interconnecting electrodes and external terminals are formed of a netted or porous electrically conductive member. By using the netted or porous electrically conductive materials as the electrode terminals 5, 6, the electrode terminals 5, 6 can be firmly bonded to the moisture-proofing multi-layered film 4. Moreover, by increasing the thickness of the heat fusible layer at the sealing portion X passed through by the electrode terminals 5, 6, shorting can be prevented from occurring.

13 Claims, 9 Drawing Sheets

THIN TYPE CELL HAVING SUPERIOR AIR-TIGHTNESS AND MECHANICAL STRENGTH

BACKGROUND OF THE INVENTION

1. Field of the invention

This invention relates to a thin type electric cell used for reducing the size and weight of a portable electric equipment. More particularly, it relates to an electrode terminal structure thereof.

2. Description of Related Art

Recently, an electric cell has come to play a crucial role industrially as a power source for portable electrical equipments. For reducing the size and the thickness of the equipments, there is raised a demand for the cell to be able to be housed in a limited space in the equipment. For this purpose, a lithium cell having high energy density and high output density is thought to be most appropriate.

On the other hand, for reducing the size and the weight of the equipment, such a cell which is flexible and high in the degree of freedom in morphology, thin in thickness and large-sized in area or which is thin in thickness and small-sized in area, is desired. These requirements, however, cannot be met if a conventional metal can is used as an outer packaging member. In particular, with a moisture-proofing type multi-layered film, comprised of a heat-fusion type high molecular weight film layer and a metal foil layer, a heretically sealed structure can be realized by hot sealing, while the film itself has superior strength and air-tightness. Thus, the moisture-proofing type multi-layered film is promising as a candidate for the outer packaging material for a cell having high degree of freedom in morphology or a thin type cell.

However, in establishing electrical conduction between the electrode and the external terminal in the moisture-proofing type multi-layered film, through an electrode terminal at a sealing opening of the outer packaging material, the thin sealing opening cannot be sealed with a thick metal wire, while a fine metal wire by itself cannot assure sufficient conductivity. The sealing opening can be reduced in thickness, while conductivity can also be provided, if a metal foil is used for the electrode terminal. However, sufficient tightness in adhesion cannot be provided between the heat fusion type high molecular weight film layer and the metal foil (electrode terminal). The result is that application of the slightest stress leads to delamination to render it impossible to maintain air-tightness of the cell.

Thus, with the electrode terminal of a metal wire or a metal foil, satisfactory air-tightness or mechanical strength cannot be achieved. In particular, the lithium cell, for which investigations are proceeding briskly because of the high energy density and high output density, and which has a sufficient moisture-proof construction is required to be high in air-tightness.

SUMMARY OF THE INVENTION

It is therefore an object of the present invention to provide a thin type cell having superior air-tightness and mechanical strength.

As a result of our perseverant researches, the present inventors have found that, by using a netted or porous electrically conductive material for the electrode terminals, it becomes possible to improve tight bonding between the moisture-proofing multi-layered film and the electrode terminals.

That is, the present invention provides a thin type cell including a cathode, an anode and an electrolyte, sheathed within a moisture-proofing multi-layered film formed by a high molecular weight film and a metal foil, in which electrode terminals interconnecting electrodes and external terminals are formed of a netted or porous electrically conductive member.

The netted or porous electrically conductor may preferably be one of metal nets, expanded metal, punched metal and aggregates of carbon fibers.

The netted or porous electrically conductor may preferably be one of carbon, nickel, aluminum, copper, tungsten, stainless steel, iron, silver, gold, alloys thereof or metal plated with the above metals or alloys.

In the thin type cell of the present invention, since the electrode terminals are formed of a netted or porous electrically conductive member, the high molecular weight films at the sealing portion, such as the heat fusible high molecular film layer or the adhesive resin, penetrates into the interstices of the electrode terminals to render the electrode terminal and the high molecular film less liable to be delaminated from each other to realize superior air tightness and mechanical strength.

In the thin type cell of the present invention, it is desirable that the opening portion of the moisture-proofing multi-layered film is sealed by the high molecular weight film and that the high molecular weight film passed through by the electrode terminal is thicker than the remaining areas of the sealing portion. For example, a resin piece is desirably applied or otherwise covers the surface of the electrode terminal in register with the sealing portion.

If the portion of the high molecular weight film lying at the sealing portion passed through by the electrode terminal is thicker than other areas of the sealing portion, the electrode terminals (cathode and the anode) can be prevented from shorting due to contact with the metal foil layer.

With the thin type cell of the present invention, in which the electrode terminals are formed by the netted or porous electrically conductive members, the bonding between the electrode terminals and the moisture-proofing multi-layered film can be improved in tightness to assure superior air-tightness and mechanical strength. Moreover, the shorting of the cathode and the anode can be prevented from occurring, as a result of which the service life, long-term storage characteristics and mechanical strength of the cell can be improved to improve the performance and the reliability of the cell.

DESCRIPTION OF PREFERRED EMBODIMENTS

Figure 1:
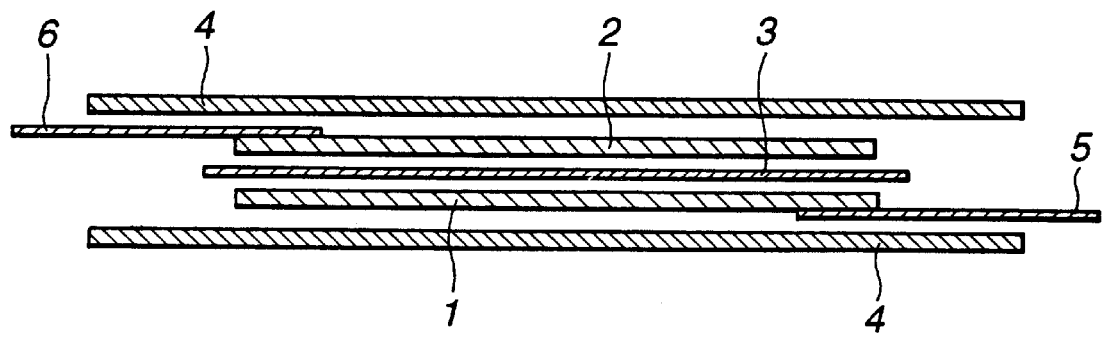
FIG. 1 is a cross-sectional view showing a thin type cell of the present invention prior to sealing.
Figure 2:
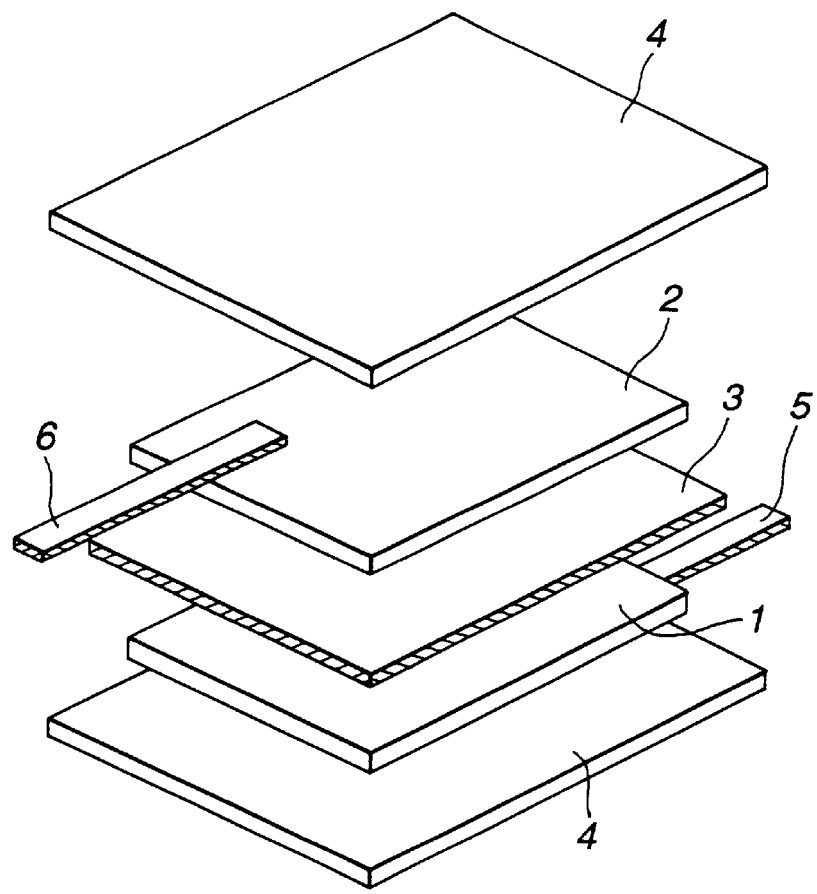
FIG. 2 is an exploded perspective view of the thin type cell prior to sealing.

Referring to the drawings, preferred embodiments of thin type cell according to the present invention will be explained in detail.

A thin type cell according to the present invention is such a cell in which a cathode 1 and an anode 2 are layered with a separator 3 and/or a solid a non-aqueous liquid or a gel electrolyte in-between and are sandwiched between outer packaging material made up of moisture-proofing multi-layered films 4, 4, as shown in FIGS. 1 to 4. If the solid electrolyte is not used, the inside of the cell is charged with a non-aqueous liquid electrolyte.

The moisture-proofing multi-layered film 4 is made up of a heat fusible high molecular weight film layer 4a, a metal foil layer 4b and a high molecular weight film layer 4c, layered in this order, with the heat fusible high molecular film layer 4a facing the inside of the cell.

A cathode terminal 5 has its one end passed through the heat fusible high molecular weight film layer 4a so as to be exposed to outside, while having its opposite end electrically connected to the cathode 1. Similarly, a anode terminal 6 has its one end passed through the heat fusible high molecular weight film layer 4a so as to be exposed to outside, while having its opposite end electrically connected to the anode 2. The cathode terminal 5 and the anode terminal 6 may be connected to an electrode material or to a current collector. The connecting methods include pressure bonding, welding and adhesion by an electrically conductive material. Although the cathode terminal 5 and the anode terminal 6 are led out at opposite sides, the terminals 5, 6 may be arranged in any other optional manner unless the terminals 5, 6 are contacted with each other to cause cell shorting.

The feature of the thin type cell according to the present invention is that a reticulated or porous electrically conductive material is used for the cathode terminal 5 and the anode terminal 6 (collectively termed electrode terminals).

Specifically, these electrode terminals may be of a reticulated or netted structure obtained by knitting fine wires, a parallel array of a number of thin fine wires, or of a netted structure comprised of an irregular array of fine wires connected together. The separation between neighboring fine wires is preferably 0.5 to 2 times the diameter or the long diameter of the fine wire. In addition, the electrode terminal may be a flat plate structure having interspersed holes or slits.

The electrode terminals having this netted or porous structure may be enumerated by a metal net, expanded metal, punched metal or an aggregate of carbon fibers.

Examples of the materials (electrically conductive material) for the electrode terminals preferably include carbon, nickel, aluminum, copper, tungsten, stainless steel, iron, silver, gold, alloys thereof or metal plated with these metals or alloys, in view of strength and machinability.

The same or different materials may be used for the electrode terminals, that is cathode terminal 5 and the anode terminal 6. From the viewpoint of the electrochemical or chemical stability, aluminum, gold and carbon are preferred for the cathode terminal 5, while copper is preferred for the anode terminal 6. Among terminal materials usable both for the cathode and the anode, nickel and stainless steel are preferred.

This cell is sealed by hot pressing an opening end not overlapped with the electrode of the moisture-proofing multi-layered film 4 as an outer packaging material. This opening end is shown shaded in FIG. 4.

Figure 3:
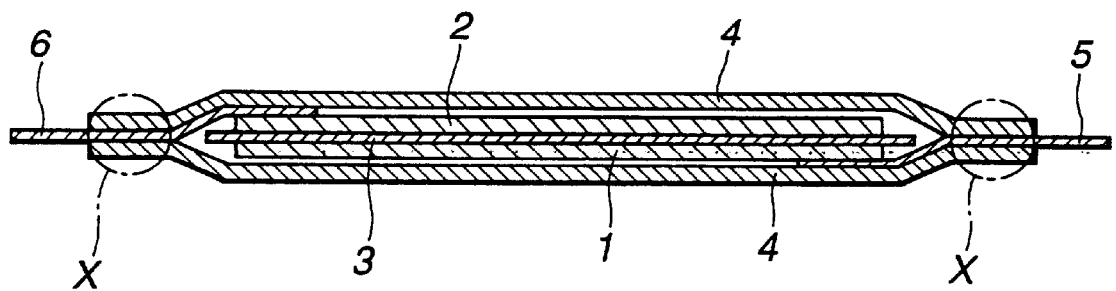
FIG. 3 is a cross-sectional view of the thin type cell subsequent to sealing.
Figure 4:
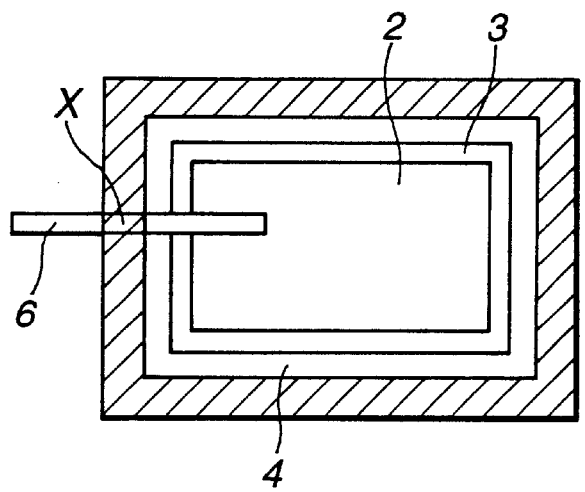
FIG. 4 is a perspective view, seen from above, of the thin type cell subsequent to sealing.
Figure 5:
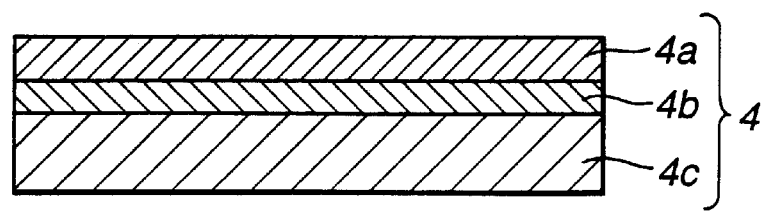
FIG. 5 is a cross-sectional view of a moisture-proofing multi-layered film of the thin type cell.
Figure 6:
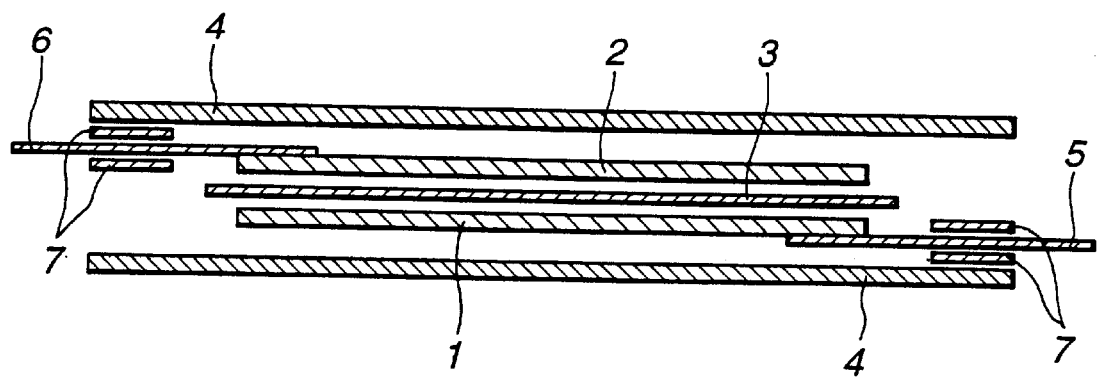
FIG. 6 is a cross-sectional view of the thin type cell with a resin piece applied to a sealing portion X of the electrode terminal thereof shown in FIG. 1.
Figure 7:
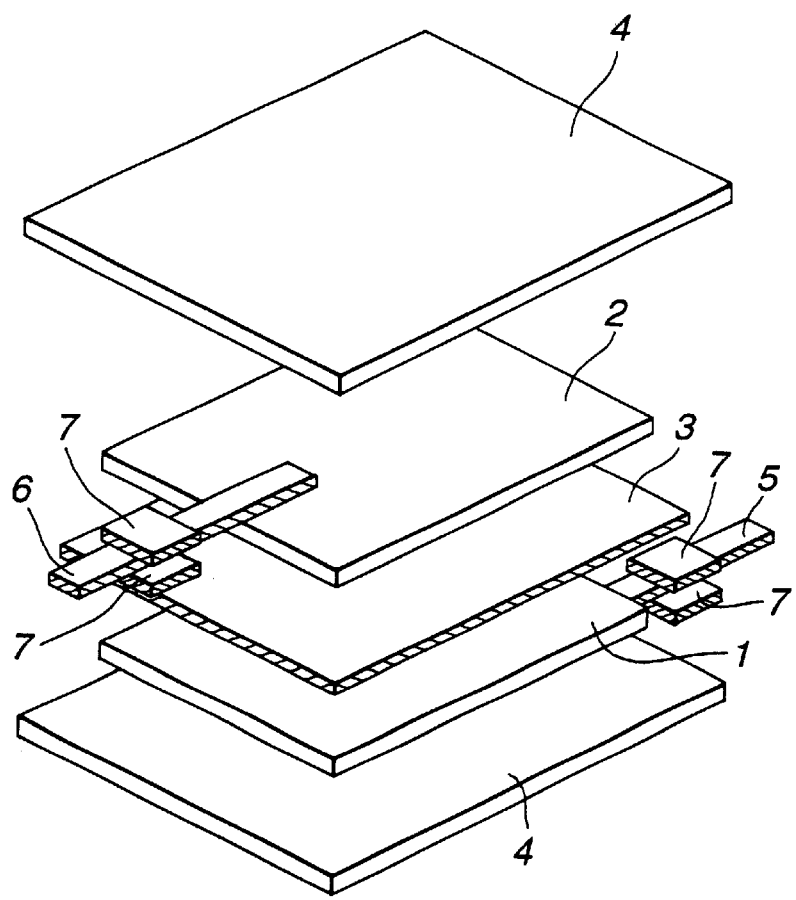
FIG. 7 is an exploded perspective view of the thin type cell of FIG. 6 prior to sealing.
Figure 8:
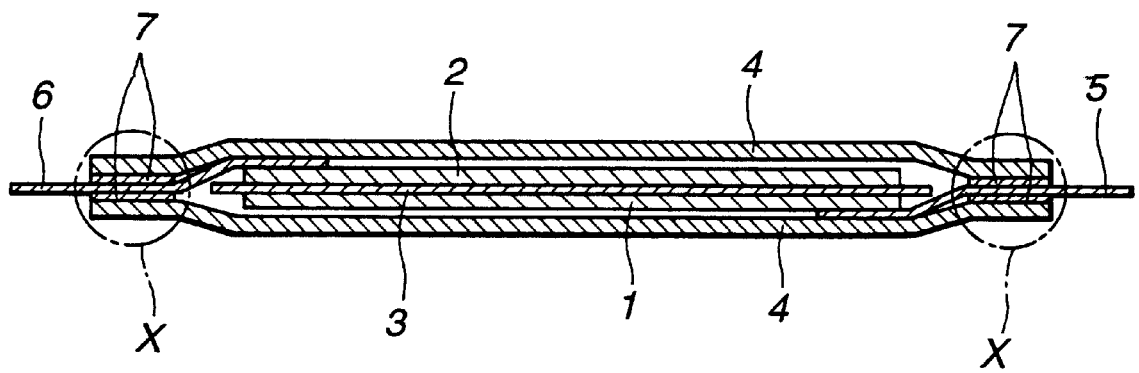
FIG. 8 is an exploded perspective view of the thin type cell of FIG. 6 subsequent to sealing.
Figure 9:
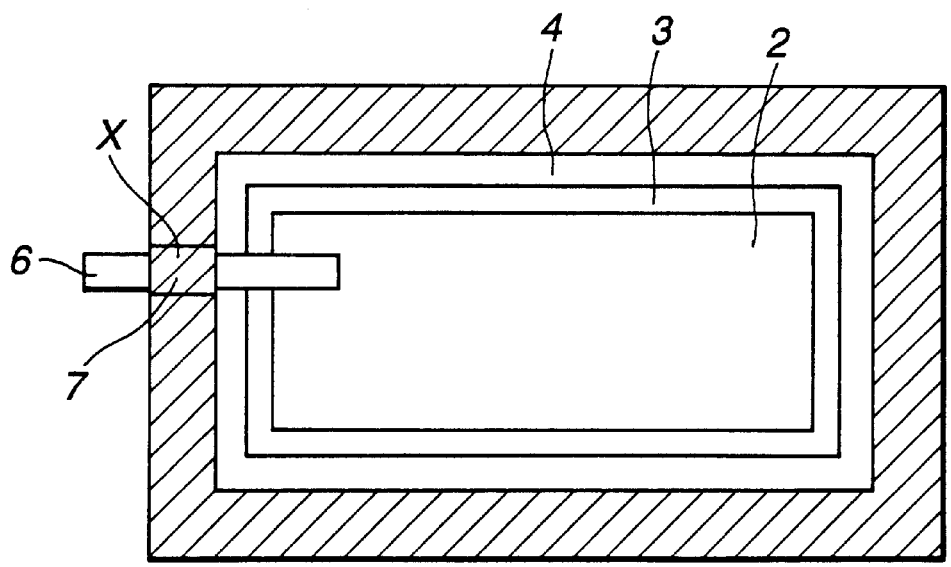
FIG. 9 is a perspective view, seen from above, of the thin type cell of FIG. 6 subsequent to sealing.

During this sealing, the electrode terminals are passed through the heat fusible high molecular weight film layer 4a so as to be sealed at a sealing end X as shown in FIGS. 3 and 4. Since the electrode terminals are of a netted or porous structure, the material of the heat fusible high molecular weight film layer 4a penetrates into interstices of the electrode terminals to unify the electrode terminals with the material of the front and reverse side heat fusible high molecular weight film layers 4a.

Since the material of the heat fusible high molecular weight film layer 4a penetrates into interstices of the electrode terminals during sealing of the thin type cell of the present invention, the electrode terminals and the heat fusible high molecular weight film layer 4a are strongly unified to each other with the least possibility of delamination thus realizing superior air-tightness and mechanical stability. Thus, the cell is improved significantly in service life, long-term storage properties and mechanical durability for assuring superior cell performance and reliability.

The thickness of each electrode terminal is required to be equal or smaller than the thickness of the heat fusible high molecular weight film layer 4a at the sealing portion X (sum of the thicknesses of two front and reverse sides).

If the electrode terminal has an excessive thickness, the risk is high that, on sealing by thermal fusion, net-like fibers of electrode terminals pierce the heat fusible high molecular weight film layer 4a into contact with the inner metal foil layer 4b. If both electrode terminals of the cathode terminal 5 and the anode terminal 6 are substantially contacted with the inner metal foil layer 4b, the cell is short-circuited.

For preventing this short-circuiting, the thickness of the electrode terminal may be set so as to be smaller than that of the heat fusible high molecular weight film layer 4a. Conversely, the thickness of the resin material of the heat fusible high molecular weight film layer 4a may be thicker. The above problem can be addressed by increasing the thickness of the resin material, in particular the thickness of the sealing portion X of the heat fusible high molecular weight film layer 4a passed through by the electrode terminals. In this case, the thickness of the portion of the resin material other than the sealing portion X need not be increased unnecessarily.

For sealing by the moisture-proofing multi-layered film 4, since the thickness of the resin material in the sealing portion X needs to be thicker than the thickness of the electrode terminal in the melted state, the thickness of the resin material in the sealing portion X is preferably twice to thrice the thickness of the electrode terminal. If the resin thickness is excessive, the moisture can be intruded by diffusion at the thickened portion into the inside of the cell to deteriorate the cell performance. In addition, the sealing structure tends to be complex in shape to produce a creased region via which the moisture can be intruded into the cell.

For realizing this increased thickness, it is possible to increase the thickness of the resin material of the heat fusible high molecular weight film layer 4a of the sealing portion X passed through by the electrode terminals. Alternatively, a heat-fusible resin piece 7 may be applied to the surface portion of the electrode terminal contacted with the sealing portion X of the electrode terminal.

The heat fusible resin used for this purpose may be enumerated by polyolefin resins, polyamide resins, vinyl acetate resins, acrylic resins or epoxy resins, similar to those used for the heat fusible high molecular weight film layer 4a used on the inner side of the moisture-proofing multi-layered film 4, only by way of examples. If the electrode terminals are pre-coated with an insulating resin, not only the heat-fusible resins but also any resin types may be used if these resins are chemically stable and can be satisfactorily bonded to the electrode terminals and to the inner layer (heat fusible high molecular weight film layer 4a). For example, an epoxy resin is given, only by way of an example, for its bonding performance and chemical stability.

The width and the length of the electrode terminals are matched to the shape of the cell. Preferably, the width and the length are selected so that the voltage generated across both ends of the electrode terminals used as cells will be not higher than 1/100 of the nominal voltage of the cell.

The moisture-proofing multi-layered film 4, used as the outer packaging material, is comprised of a heat fusible high molecular film layer 4a for bonding, a metal foil layer 4b for increasing air tightness and a high molecular film layer 4c for maintaining the strength. The film layer 4c may also be a heat-fusible high molecular film. It is indispensable that the metal foil layer is sandwiched between the high molecular film layers. Thus, a larger number of high-molecular films or metal foil layers may be layered together.

Moreover, since the sealing portion X is optimally sealed by heat fusion, the side of the moisture-proofing multi-layered film 4 towards the inside of the cell is preferably the heat fusible high molecular film layer 4a. However, a heat-resistant high-molecular layer may be used in substitution for the heat fusible high molecular weight film layer 4a so that the sealing portion X is sealed with the adhesive resin instead of with the heat fusible high molecular weight film. If the adhesive resin is used, bonding can be effected at ambient temperature.

Reference is now made to the material types of the moisture-proofing multi-layered film 4.

The materials of the heat fusible high molecular weight film layer 4a for bonding may be enumerated by polyolefin resins, such as polyethylene or polypropylene, polyamide resins, such as nylon, vinyl acetate resins, acrylic resins or epoxy resins, only by way of illustration. The adhesive resins may be enumerated by epoxy resins, again only by way of illustration, because of adhesive properties to metal or resin and chemical stability.

There is no particular limitation to the materials of the metal foil layer 4b if the material is lightweight, flexible and chemically stable. An example of the material is aluminum which is meritorious in view of physical properties and cost.

The material of the high molecular film layer 4c for maintaining the strength may be enumerated by polyamide resins, such as nylon, polyethylene terephthalate, and polyolefin resins, such as polyethylene or polypropylene resins.

Of these, polyethylene terephthalate and nylon resins are meritorious in view of mechanical strength.

As the moisture-proofing multi-layered film 4, well-known general-purpose laminate resins may be used with utmost effects.

Figure 10:
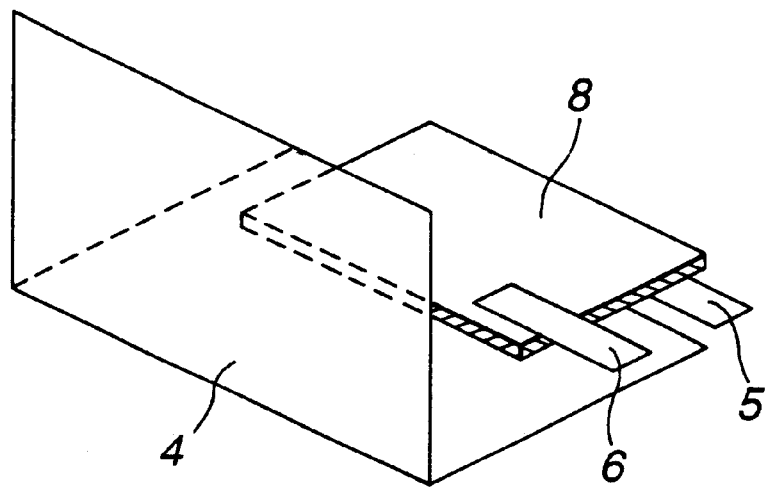
FIG. 10 is a perspective view of a thin type cell, prior to sealing, according to a modification of the present invention.
Figure 11:
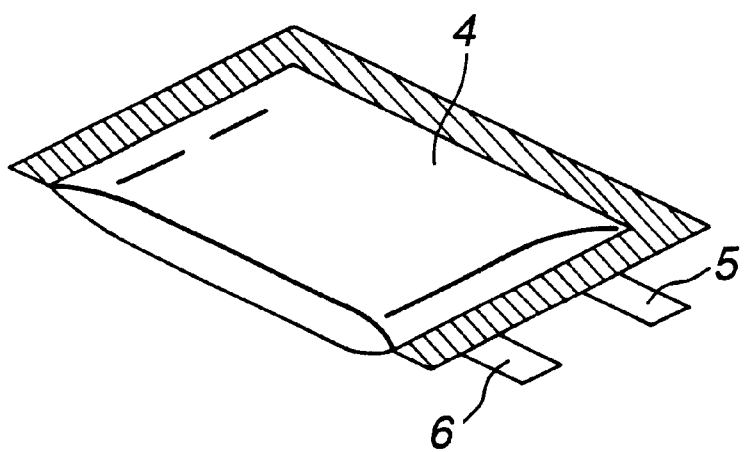
FIG. 11 is a perspective view of the thin type cell, subsequent to sealing, of the modification shown in FIG. 10.
Figure 12:
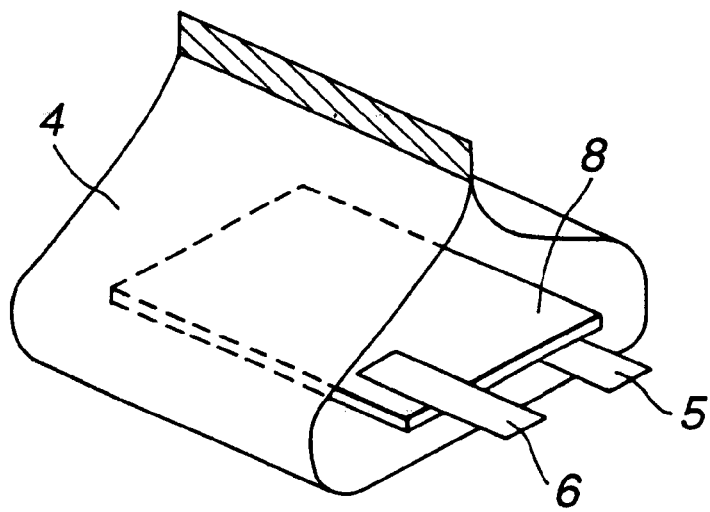
FIG. 12 is a perspective view of a thin type cell, prior to sealing, of a further modification of the present invention.
Figure 13:
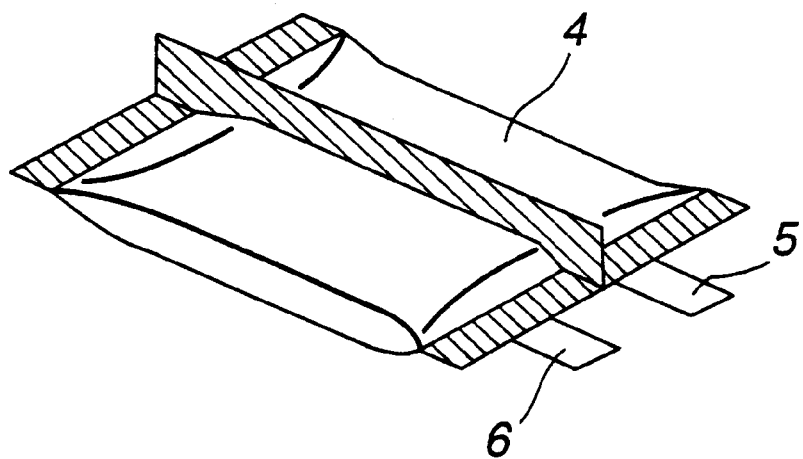
FIG. 13 is a perspective view of the thin type cell of FIG. 12 subsequent to sealing.

In the thin type cell, shown in FIGS. 1 to 9, the entire rim portions (four sides) of the moisture-proofing multi-layered film 4 are sealed. The present invention, however, is not limited to this configuration. From the viewpoint of the manufacturing process of the thin type cell, it is also possible to hot-press three sides of the moisture-proofing multi-layered film 4 for sealing when accommodating the electrode devoices 8 in the moisture-proofing film 4, as shown in FIGS. 10 and 11. When housing the electrode devoices 8 in the moisture-proofing film 4, both ends of the moisture-proofing multi-layered film 4 may be bonded together to a ring shape and the resulting two sides may then be hot-pressed together for sealing, as shown in FIG. 13. The sealing state is shown shaded in FIGS. 12 and 13.

The thin type cell shown in FIGS. 1 to 9 is made up of a sole cathode and a sole anode, only by way of illustration. For example, plural cathodes and plural anodes may be layered or wrapped together for use as the thin type cell. The number or the a real measure of the cathodes and those of the anodes need not be equal to each other.

The thin type cell according to the present invention may be of the primary cell configuration or of the secondary cell configuration.

If the cell is of the primary cell configuration, it is preferred that the anode is formed of metal lithium and the cathode is formed of a material capable of occluding lithium ions. The electrolyte is preferably a non-aqueous liquid electrolyte, solid electrolyte or a gel electrolyte. These electrolytes of known structures may be used.

If the cell is of the primary cell configuration, it is preferred that the anode is formed of metal lithium, lithium alloys or a material that can reversibly introduce or remove lithium, the cathode is formed of a material that can reversibly introduce or remove lithium and the electrolyte is formed of one of the non-aqueous liquid electrolyte, solid electrolyte or the gel electrolyte. These electrolytes of known structures may be used.

EXAMPLES

The present invention will be hereinafter explained with reference to specified experimental results.

Experiment a

In the experiment a, the use of a netted or porous electrically conductor for the electrode terminal was checked as to its effectiveness.

EXAMPLE 1

A thin type cell shown in FIG. 3 was produced as follows:

First, a moisture-proofing multi-layered film 4 was produced by heat-fusing a polyethylene terephthalate film (high molecular weight film layer 4c) 12 $\mu$m in thickness and a polypropylene film (heat fusible high molecular weight film layer 4a) 70 $\mu$m in thickness to one side and to the opposite side of a aluminum foil (metal foil layer 4b), respectively, to produce a moisture-proofing multi-layered film 4 which was 89 $\mu$m in thickness. This moisture-proofing multi-layered film 4 was sliced into two sections, each 8 cm×10 cm in size, so as to be used as outer packaging materials.

The cathode 1 was then fabricated by dispersing 90 wt % of powdered manganese dioxide, 2 wt % of powdered polyvinylidene fluoride and 7 wt % of powdered graphite in a solvent dimethyl formamide. The resulting dispersion was coated on a aluminum net as a current collector and dried in vacuum at 100° C. for 24 hours. The resulting product was suitably pressed by a roll press to a thickness of 130 µm. The resulting produce was cu to sizes of 4 cm ×8 cm so as to be used as a positive electrode 1.

The anode 2 was fabricated by slicing a plate of metal lithium 300 µm in thickness to sizes of 4 cm×8 cm.

The cathode terminal 5 and the anode terminal 6 were fabricated by slicing a metal net, obtained on knitting stainless steel wires 50 µm in diameter at a separation of 75 µm to an overall thickness of 110 µm, to sizes of 5 mm×3 cm. The cathode terminal 5 and the anode terminal 6 were press-bonded to the cathode 1 and to the anode 2, respectively.

The electrode was fabricated as follows:

After mixing ethylene carbonate (EC) and propylene carbonate (PC) for dissolution, poly acrylonitrile (PAN) was mixed thereto and agitated to adjust the viscous solution. To this solution was added lithium phosphate hexafluoride (LiPF6) to give a gellated electrolyte. The molar proportions for charging of PAN, EC, PC and LiPF6 was set to PAN:EC:PC:LiPF6=12:53:27:8.

For the separator 3, a polypropylene non-woven fabric was used.

The gellated electrolyte was coated on the cathode 1 and the anode 2 and the moisture-proofing multi-layered film 4, anode 2, separator 3, cathode I and the moisture-proofing multi-layered film 4 were layered in this order. The moisture-proofing multi-layered film 4 was layered with the heat fusible high molecular film layer 4a facing the inside of the cell.

The cathode terminal 5 and the anode terminal 6 were sandwiched in the sealing portion X and the rim portion of the moisture-proofing multi-layered film 4 not overlapped with the electrode material was heated and fused together to seal the entire assembly to produce a lithium primary cell.

Example 2

Using iron sulfide (FeS2) and metal lithium for the cathode I and the anode 2, respectively, the lithium primary cell was fabricated in the same sequence as that in Example 1.

Example 3

Using lithium cobaltate (LiCoO2) and metal lithium for the cathode 1 and the anode 2, respectively, the lithium secondary cell was fabricated in the same sequence as that in Example 1.

Specifically, 91 wt % of lithium cobaltate (LiCoO2), 3 wt % of powdered vinylidene polyfluoride and 9 wt % of powdered graphite were used.

Example 4

Using lithium cobaltate (LiCoO2) and carbon difficult to graphatize for the cathode 1 and the anode 2, respectively, the lithium secondary cell was fabricated in the same sequence as that in Example 1.

Specifically, 91 wt % of lithium cobaltate (LiCoO2), 3 wt % of powdered vinylidene polyfluoride and 9 wt % of powdered graphite were used and the same procedure as that used in Example 1 was used for fabrication.

The anode 2 was fabricated as follows: 91 wt % of carbon difficult to graphatize and 9 wt % of powdered vinylidene polyflouride were dispersed in solvent N-methyl pyrrolidone and the resulting dispersion was coated on a copper foil and dried in vacuum at 120° C. for 24 hours. The resulting product was suitably pressed by a roll press to a thickness of 200 µm so as to be used as the negative electrode 2.

Example 5

Using lithium cobaltate (LiCoO2) and graphite for the cathode 1 and the anode 2, respectively, the lithium secondary cell was fabricated in the same sequence as that in Example 1.

Specifically, 91 wt % of lithium cobaltate (LiCoO2), 3 wt % of powdered vinylidene polyfluoride and 9 wt % of powdered graphite were used, and the same procedure as that used in Example 1 was used for fabrication.

The anode 2 was fabricated as follows: 91 wt % of carbon difficult to graphatize and 9 wt % of powdered vinylidene polyflouride were dispersed in solvent N-methyl pyrrolidone and the resulting dispersion was coated on a copper foil and dried in vacuum at 120° C. for 24 hours. The resulting product was suitably pressed by a roll press to a thickness of 170 µm so as to be used as the negative electrode 2.

Comparative Example 1

As the cathode terminal 5 and the anode terminal 6, a nickel foil 100 µm thickness, cut to sizes of 5 mm×3 cm, were used. Using the procedure for fabrication otherwise the same as that of Example 1, the electrode terminals were connected to the electrodes and sealed in a clinched fashion at the sealing portion X of the moisture-proofing multi-layered film 4 to fabricate the lithium primary cell.

Comparative Example 2

A nickel foil 100 µm thickness, cut to sizes of 5 mm×3 cm, was used as the electrode terminal in the same way as in Comparative Example 1. Using the procedure for fabrication otherwise the same as that of Example 3, the electrode terminals were connected to the electrodes and sealed in a clinched fashion at the sealing portion X of the moisture-proofing multi-layered film 4 to fabricate the lithium secondary cell.

Comparative Example 3

A nickel foil 100 µm thickness, cut to sizes of 5 mm×3 cm, was used as the electrode terminal in the same way as in Comparative Example 1. Using the procedure for fabrication otherwise the same as that of Example 4, the electrode terminals were connected to the electrodes and sealed in a clinched fashion at the sealing portion X of the moisture-proofing multi-layered film 4 to fabricate the lithium secondary cell.

Evaluation of Characteristics

The Examples and Comparative Examples were evaluated by conducting a storage test for measuring the amount of moisture in the cell.

Figure 14:
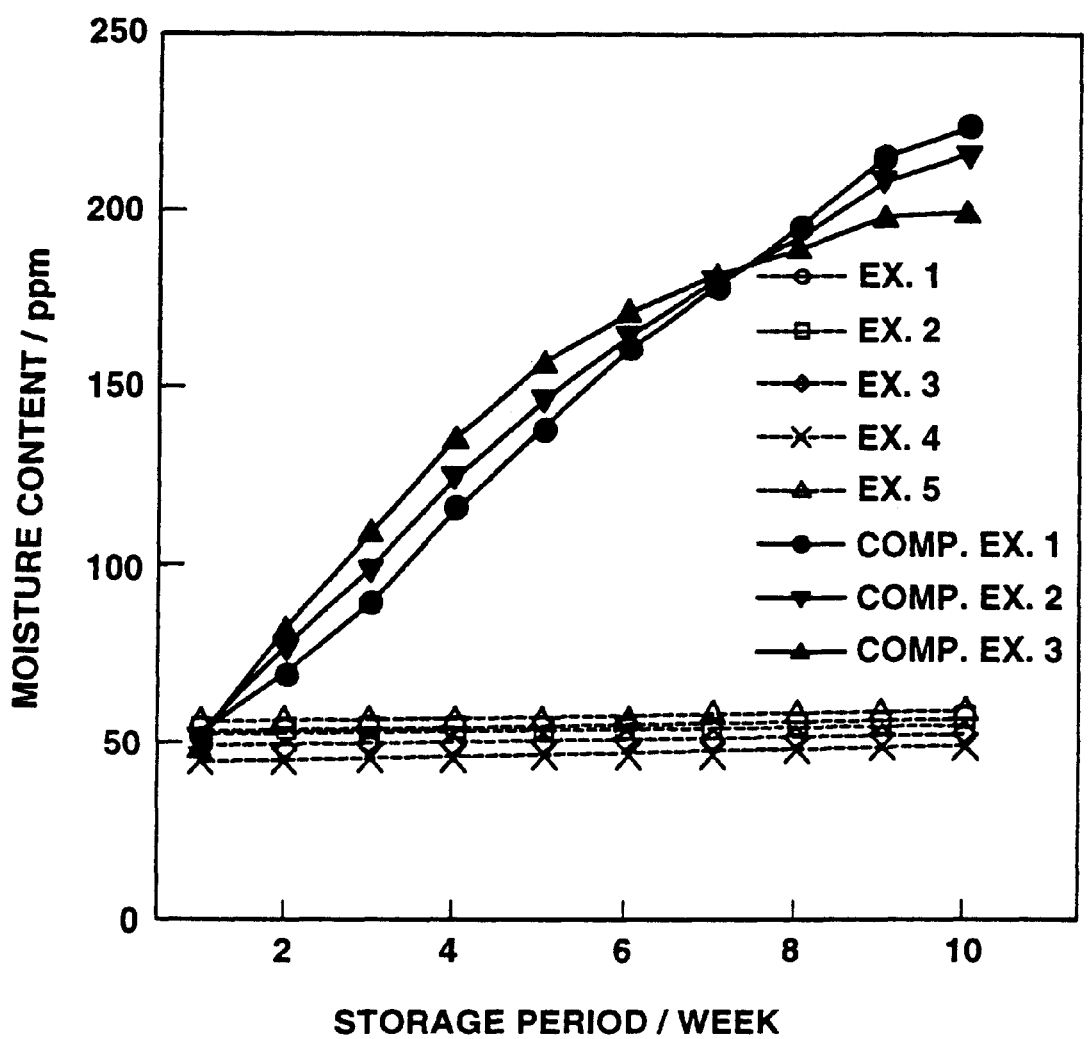
FIG. 14 is a graph showing the relation between the storage period and the amount of moisture in the electrolyte.

That is, the cells of Examples 1 to 5 and the Comparative Examples 1 to 3 were kept for a pre-set time in atmospheric air at normal temperature and humidity and dismounted subsequently for measuring the moisture in the electrolyte by a Karl-Fischer moisture meter. The results are shown in FIG. 14.

For the cells of Examples 1 to 5 and the Comparative Examples 1 to 3, measurements were made of time changes of the open-circuit voltage after storage for a pre-set time duration versus initial open-circuit voltage directly following the fabrication. The results are shown in FIG. 15.

For the lithium secondary cells of the Example 3 and the Comparative Example 2, discharge characteristics on storage for 10 weeks were measured under conditions of the discharge current of 0.25 mA/cm$^2$ and the temperature of 23° C. The results are shown in FIG. 16.

The secondary cells were charged up to 80% of its capacity and put to a storage test.

Figure 15:
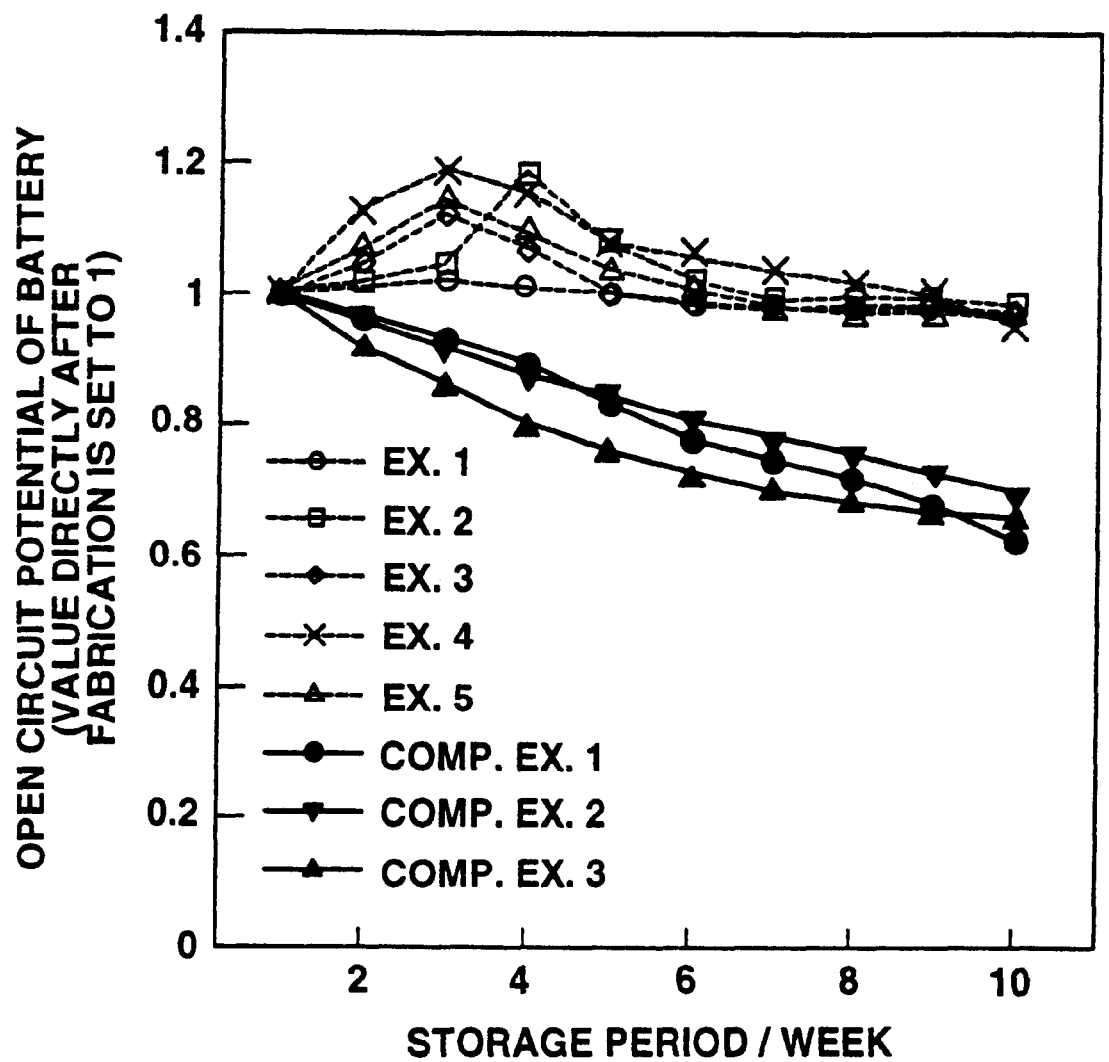
FIG. 15 is a graph showing the relation between the storage time and the open-circuiting potential of the cell.
Figure 16:
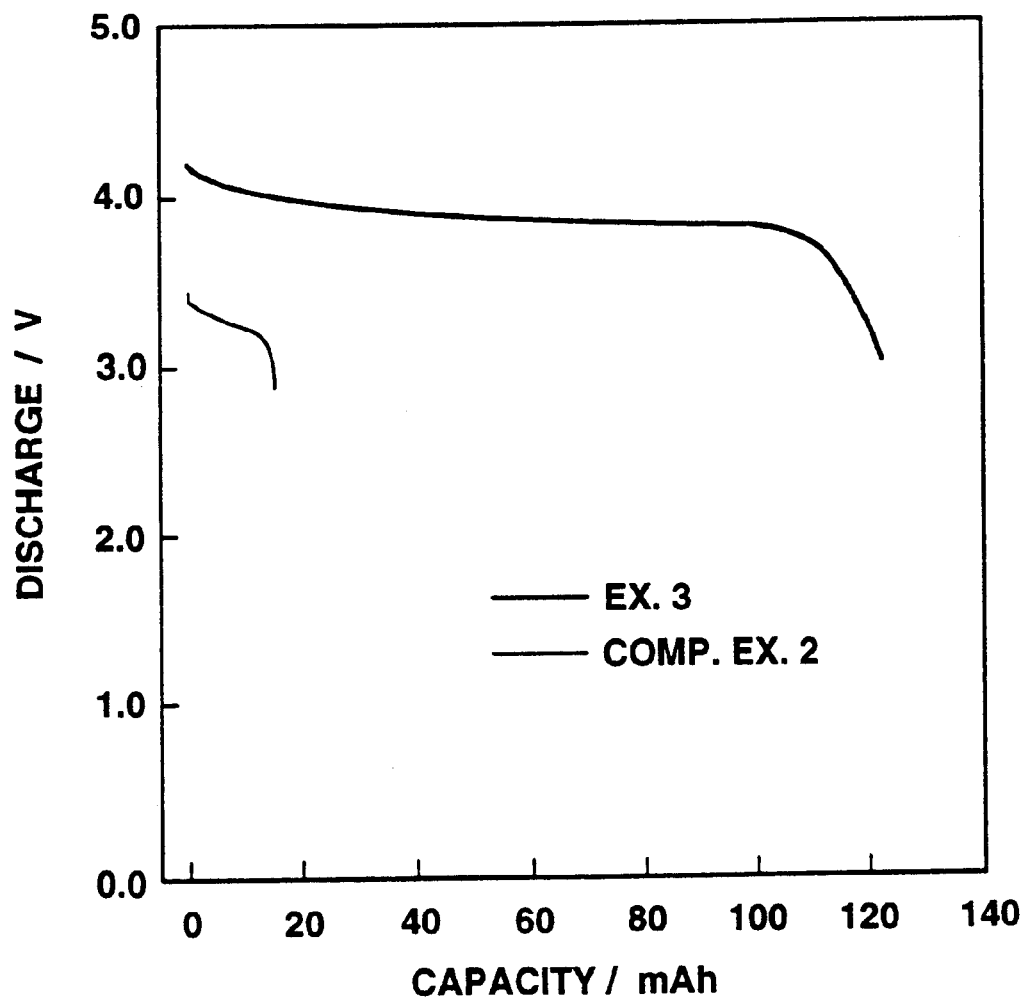
FIG. 16 is a graph showing the relation between the charging capacity and the discharging capacity of the cell after storage for ten weeks.

It is seen from the results of FIGS. 14 to 16 that the cells of the Examples 1 to 5 exhibit high air-tightness and high performance. Conversely, with the cells of the Comparative Examples 1 to 3, the heat fusible high molecular film layer 4a and the electrode terminals (nickel foils) at the sealing portion X are delaminated on application of the slightest stress to allow moisture intrusion to lose its performance.

On comparison of the anodes 2 (metal lithium) of the Examples 1 to 3 and the Comparative Example 1, metal lithium retained its metal luster in the Examples 1 to 3, whereas, in the Comparative Example 1, gray-to-white powders attributable to lithium hydroxide were left in large quantities.

As may be seen from these results, if a metal net is used as an electrode terminal, it becomes possible to improve tight bonding between the electrode terminal and the heat-fusible high molecular film layer to prevent delamination of the electrode terminals and the heat-fusible high molecular film layer to prevent intrusion of the moisture which otherwise significantly affects the cell performance. Specifically, the use of the netted or porous electrically conductor as the electrode terminal leads to improved air-tightness and mechanical strength of the cell.

Experiment b

In the Experiment b, the possible effect of increasing the resin layer at the sealing portion X was checked.

Example 6

For sealing the terminal portion, a polyethylene piece 7 of the same material as the heat fusible high molecular film layer 4a was previously applied to each of the front and back surfaces of the sealing portion X of the electrode terminals. The polyethylene pieces 7 were each 100 μm in thickness.

The width of the polyethylene coating was 1 mm on the left and right sides plus the width of the electrode terminal 1, so that the combined width was the width of the electrode terminal plus 2 mm. The length of the polyethylene coating was the length of the sealing portion X plus 1 mm on both ends, such that the combined length was the length of the sealing portion X plus 2 mm.

The lithium primary cell was fabricated in otherwise the same way as in Example 1.

Example 7

The resin thickness at the sealing portion X of the heat fusible high molecular film layer 4a was set to 200 μm.

The width of the thickened resin thickness portion of the heat fusible high molecular film layer 4a was the width of the electrode terminal plus 1 mm on the left and right sides, such that the combined width is the width of the electrode terminal plus 2 mm, while the length of the thickened resin thickness portion was the length of the sealing portion X plus 1 mm on both sides, such that the combined length was the length of the sealing portion X plus 2 mm.

The lithium primary cell was fabricated in otherwise the same way as in Example 1.

Example 8

The front and back sides of the sealing portion X of the electrode terminal were previously coated with polyethylene which is the same material as that used for the heat fusible high molecular film layer 4a. The polyethylene coating was 100 μm thick on each side.

The electrode terminal coating was of a width equal to the width of the electrode terminal plus 1 mm on left and right sides, such that the combined width was the width of the electrode terminal plus 2 mm. Also, the electrode terminal coating was of a length equal to the length of the sealing portion X plus 1 mm on both ends, such that the combined length was the length of the sealing portion X plus 2 mm.

The lithium primary cell was fabricated in otherwise the same way as in Example 1.

Example 9

The resin thickness of the heat fusible high molecular film layer 4a of the moisture-proofing multi-layered film 4 was set to 200 μm.

The lithium primary cell was fabricated in otherwise the same way as in Example 1.

Evaluation of Characteristics

The rate of occurrence of rejects due to shorting on completion of assemblage was checked of the cells of Example 1 and Examples 6 to 9. The results are shown in Table 1.

TABLE 1

|  | acceptable | rejects due to shorting |
| --- | --- | --- |
| Ex. 1 | 3 | 7 |
| Ex. 6 | 20 | 0 |
| Ex. 7 | 10 | 0 |
| Ex. 8 | 10 | 0 |
| Ex. 9 | 10 | 0 |

As may be seen from the results of Table 1, the rate of occurrence of rejects due to cell shorting is significantly decreased with the cells of the Examples 6 to 9. Conversely, with the cell of Example 1, the probability is high that the cathode terminal 5 and the anode terminal 6 pierce through the sealing portion to contact with the aluminum foil (metal foil layer 4b) to cause shorting responsible for occurrence of rejects.

It is seen from above that, by applying the resin piece to the sealing portion of the electrode terminal, coating or previously increasing the thickness of the resin material at the sealing portion for increasing the thickness of the resin material at the sealing portion passed through the electrode terminal, the shorting of the cathode and the anode and hence the initial troubles of the cell can be prevented from occurring.

What is claimed is:

1. A thin type cell comprising an outer sheath defining an interior of the cell for accommodating a cathode, an anode and an electrolyte, the outer sheath comprising a moisture-proofing three-layered film consisting of a heat fusible layer and a second layer with a metal foil layer sandwiched therebetween, the heat fusible layer facing the interior of the cell, and electrode terminals interconnecting electrodes and external terminals are formed of a netted or porous electrically conductive member, the electrode terminals passing through the outer sheath with the heat fusible layer sealingly engaging the terminals, the heat fusible layer containing a resin material that engages the terminals at a sealing portion along at least a portion of the terminals wherein a thickness of the resin material is two to three times thicker than an electrode terminal thickness of each electrode terminal.

2. The thin type cell as claimed in claim 1 wherein the netted or porous electrical conductor is made of a material selected from the group consisting of a metal net, expanded metal, punched metal and aggregates of carbon fibers.

3. The thin type cell as claimed in claim 1 wherein the netted or porous electrical conductor is made of a material selected from the group consisting of carbon, nickel, aluminum, copper, tungsten, stainless steel, iron, silver, gold and alloys thereof.

4. The thin type cell as claimed in claim 1 wherein the anode is formed of metal lithium, the cathode is formed of a material capable of occluding lithium ions and wherein the electrolyte is selected from the group consisting of a non-aqueous liquid electrolyte, a solid electrolyte and a gel electrolyte.

5. The thin type cell as claimed in claim 1 wherein the anode is formed of one of materials that can reversibly introduce or remove lithium ions, the cathode is formed of a material that can reversibly introduce or remove lithium ions and wherein the electrolyte is selected from the group consisting of a non-aqueous liquid electrolyte, a solid electrolyte and a gel electrolyte.

6. The thin type cell as claimed in claim 1 wherein an opening portion of the moisture-proofing three-layered film passed through by the electrode terminal is thicker than other areas of the sealing portion.

7. The thin type cell as claimed in claim 6 wherein a resin piece is applied to the surface of the electrode terminal at the sealing portion.

8. A thin type cell comprising:
an outer sheath defining an interior that accommodates a cathode, an anode and an electrolyte, the outer sheath comprising a three-layered structure consisting of a heat fusible layer and a second layer with a metal foil layer sandwiched therebetween, the heat fusible layer facing the interior of the cell, the cathode being connected to a first terminal that extends outward through the outer sheath, the anode being connected to a second terminal that extends outward through the sheath, the first and second terminals each having a flat structure, the electrode terminals passing through the outer sheath with the heat fusible layer sealingly engaging the terminals, the heat fusible layer containing a resin material that engages the terminals at a sealing portion along at least a portion of the terminals wherein a thickness of the resin material is two to three times thicker than an electrode terminal thickness of each electrode terminal.

9. The thin type cell of claim 8 wherein the first and second terminals are made from an electrically conductive material selected from the group consisting of carbon, nickel, aluminum, copper, tungsten, stainless steel, iron, silver, gold and alloys thereof.

10. The thin type cell of claim 8 wherein the anode comprises metal lithium, the cathode comprises the material capable of occluding lithium ions and wherein the electrolyte is selected from the group consisting of a non-aqueous liquid electrolyte, a solid electrolyte and a gel electrolyte.

11. The thin type cell of claim 8 wherein the anode comprises a material that can reversibly introduce or remove lithium ions, the cathode comprises a material that can reversibly introduce or remove lithium ions and wherein the electrolyte is selected from the group consisting of a non-aqueous liquid electrolyte, a solid electrolyte and a gel electrolyte.

12. The thin type cell of claim 8 wherein the outer sheath comprises two openings through which the first and second terminals respectively pass through, the portions of the outer sheath defining said openings having a thickness greater than remaining portions of the outer sheath.

13. The thin type cell of claim 12 further comprising first and second resin pieces disposed between the first and second terminals and the first and second openings respectively.

* * * * *